US012397219B2

(12) United States Patent
Ottenwess et al.

(10) Patent No.: US 12,397,219 B2
(45) Date of Patent: Aug. 26, 2025

(54) LIVE PREDICTION OF PLAYER PERFORMANCES IN TENNIS

(71) Applicant: STATS LLC, Chicago, IL (US)

(72) Inventors: Alexander Nicholas Ottenwess, Chicago, IL (US); Christian Marko, Graz (AT); Matjaz Ales, Maribor (SI); Filip Glojnaric, Graz (AT); Ben Mackriell, Chester (GB); Patrick Joseph Lucey, Chicago, IL (US); Robert Seidl, Munich (DE)

(73) Assignee: STATS LLC, Chicago, IL (US)

( * ) Notice: Subject to any disclaimer, the term of this patent is extended or adjusted under 35 U.S.C. 154(b) by 172 days.

(21) Appl. No.: 17/662,755

(22) Filed: May 10, 2022

(65) Prior Publication Data

US 2022/0355182 A1 Nov. 10, 2022

Related U.S. Application Data

(60) Provisional application No. 63/201,710, filed on May 10, 2021.

(51) Int. Cl.
*G06F 17/18* (2006.01)
*A63B 71/06* (2006.01)
*A63B 24/00* (2006.01)

(52) U.S. Cl.
CPC .......... *A63B 71/0616* (2013.01); *G06F 17/18* (2013.01); *A63B 2024/0056* (2013.01)

(58) Field of Classification Search
CPC ............ A63B 2024/0056; G06F 17/18; A63N 2024/0056
See application file for complete search history.

(56) References Cited

U.S. PATENT DOCUMENTS

| | | | |
|---|---|---|---|
| 6,236,900 B1 * | 5/2001 | Geiger | G07F 17/32 463/16 |
| 10,926,183 B2 * | 2/2021 | Covington | G06N 7/01 |
| 2005/0017454 A1 | 1/2005 | Endo et al. | |
| 2008/0188353 A1 * | 8/2008 | Vitolo | A61B 5/1036 482/8 |
| 2009/0046152 A1 * | 2/2009 | Aman | A63B 71/0605 348/157 |
| 2009/0262137 A1 * | 10/2009 | Walker | H04H 60/04 345/629 |
| 2013/0184039 A1 | 7/2013 | Steir et al. | |

(Continued)

OTHER PUBLICATIONS

PCT International Application No. PCT/US22/28523, International Search Report and Written Opinion of the International Searching Authority, dated Aug. 17, 2022, 8 pages.

(Continued)

*Primary Examiner* — Jay Trent Liddle
(74) *Attorney, Agent, or Firm* — Bookoff McAndrews PLLC

(57) ABSTRACT

A computing system receives pre-match data for an upcoming match between a first player and a second player. The computing system generates, using one or more prediction models, one or more pre-match predictions based on the pre-match data. The computing system receives in-match data for the match currently in progress. The computing system generates, using the one or more prediction models, one or more live match predictions based on the in-match data.

20 Claims, 13 Drawing Sheets

(56) References Cited

U.S. PATENT DOCUMENTS

| | | | |
|---|---|---|---|
| 2014/0180451 A1 | 6/2014 | Marty | |
| 2015/0131845 A1* | 5/2015 | Forouhar | G06V 20/44 |
| | | | 382/100 |
| 2015/0141175 A1 | 5/2015 | Pisupati et al. | |
| 2015/0148129 A1* | 5/2015 | Austerlade | G06Q 50/20 |
| | | | 463/31 |
| 2017/0124473 A1* | 5/2017 | Lopez | H04L 67/75 |
| 2019/0030435 A1* | 1/2019 | Dishman | A63F 13/77 |
| 2019/0043500 A1* | 2/2019 | Malik | H04N 21/2187 |
| 2019/0347956 A1* | 11/2019 | Daga | G16H 40/67 |
| 2020/0230501 A1 | 7/2020 | Schwartz et al. | |
| 2020/0234543 A1 | 7/2020 | Schwartz et al. | |
| 2020/0279160 A1 | 9/2020 | Holbrook et al. | |
| 2020/0349799 A1 | 11/2020 | Amaitis et al. | |

OTHER PUBLICATIONS

Anton Smerdov et al: "AI-enabled 1-15 Prediction of eSports Player Performance Using the Data from HeterogeneousSensors", arxiv.org, Cornell University Library, 201 Olin Library Cornell University Ithaca, NY14853, Dec. 7, 2020 (Dec. 7, 2020), XP081831595.

* cited by examiner

LIVE PREDICTION OF PLAYER PERFORMANCES IN TENNIS

CROSS-REFERENCE TO RELATED APPLICATIONS

This application claims priority to U.S. Provisional Application Ser. No. 63/201,710, filed May 10, 2021, which is hereby incorporated by reference in its entirety.

FIELD OF THE DISCLOSURE

The present disclosure generally relates to system and method for generating live prediction of player performance in tennis.

BACKGROUND

While many professional sports leagues have varying amounts of sports analytics that drive performance discussion and what-if analyses, such fine-grained statistics is typically absent from tennis. In tennis, there are varying degrees of scoring, from as granular as the game level to as broad as the overall match level.

SUMMARY

In some embodiments, a method is disclosed herein. A computing system receives pre-match data for an upcoming match between a first player and a second player. The pre-match data includes one or more of historical match data for the first player and the second player, player strength information for the first player and the second player, player style information for the first player and the second player, playing surface type, or weather conditions. The computing system generates, using one or more prediction models, one or more pre-match predictions based on the pre-match data. The computing system receives in-match data for the match currently in progress. The in-match data includes one or more of match-state information, match-statistics and features, momentum, the player strength information for the first player and the second player, the player style information for the first player and the second player, the playing surface type, or updated weather conditions. The computing system generates, using the one or more prediction models, one or more live match predictions based on the in-match data.

In some embodiments, a non-transitory computer readable medium is disclosed herein. The non-transitory computer readable medium includes one or more sequences of instructions, which, when executed by a processor, causes a computing system to perform operations. The operations include receiving, by the computing system, pre-match data for a match between a first player and a second player. The pre-match data includes one or more of historical match data for the first player and the second player, player strength information for the first player and the second player, player style information for the first player and the second player, a playing surface type, or weather conditions. The operations further include generating, by the computing system using one or more prediction models, a pre-match prediction based on the pre-match data. The operations further include receiving, by the computing system, in-match data for the match currently in progress. The in-match data includes one or more of match-state information, match-statistics and features, momentum, the player strength information for the first player and the second player, the player style information for the first player and the second player, the playing surface type, or updated weather conditions. The operations further include generating, by the computing system using the one or more prediction models, a live match prediction based on the in-match data.

In some embodiments, a system is disclosed herein. The system includes a processor and a memory. The memory has programming instructions stored thereon, which, when executed by the processor, causes the system to perform operations. The operations include receiving pre-match data for a match between a first player and a second player. The pre-match data includes one or more of historical match data for the first player and the second player, player strength information for the first player and the second player, player style information for the first player and the second player, a playing surface type, or weather conditions. The operations further include generating, using one or more prediction models, a pre-match prediction based on the pre-match data. The operations further include receiving in-match data for the match currently in progress. The in-match data includes one or more of match-state information, match-statistics and features, momentum, the player strength information for the first player and the second player, the player style information for the first player and the second player, the playing surface type, or updated weather conditions. The operations further include generating, using the one or more prediction models, a live match prediction based on the in-match data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In sports like tennis, there are many different levels of scoring, which can provide an indication of performance at any point of time at varying scales. For example, in the short term, there is game-level scoring; in this mid-term, there is set-level scoring; and in the long-term, there is match-level scoring. Even though the multi-scale scoring mechanism may provide an indication of which player may be dominating in the short-term, mid-term, and long-term, such approach does not take into consideration other important contextual features, such as player strength/style and court-type information. Additionally, the match-score typically only tells viewers what has happened in the game and cannot convey the importance of each point or simulate alternative outcomes in key moments.

One or more techniques described herein provide an improvement over conventional techniques by providing a system that can provide predictions of a player winning a next-point, current game (and game score), current set (and set score), and winning the overall match after every logged event which captures the granular player specific and context specific information.

In some embodiments, the one or more techniques described herein may not only provide granular and specific predictions, but also can leverage these predictions of "what-if" analyses, which may provide or generate alternative outcomes at every point (such as, for example, break points). The various predictions and what-if analyses make take in the current score or any possible input score query (or match-up of players). The input and output to the model may take the shape of any form, such as an interactive website/widget, chatbot or virtual assistant, speech recognizer, or the like. In some embodiments, the output can be text, visual, or an overlay on a broadcast (linear or over-the-top (OTT)).

Additionally, one or more techniques provided herein may leverage the various predictions to create new tennis metrics, such as "clutch," "plus/minus," and "momentum." The predictions and derived metrics may then be used to generate and rank insights which may be provided to end users.

Figure 1:
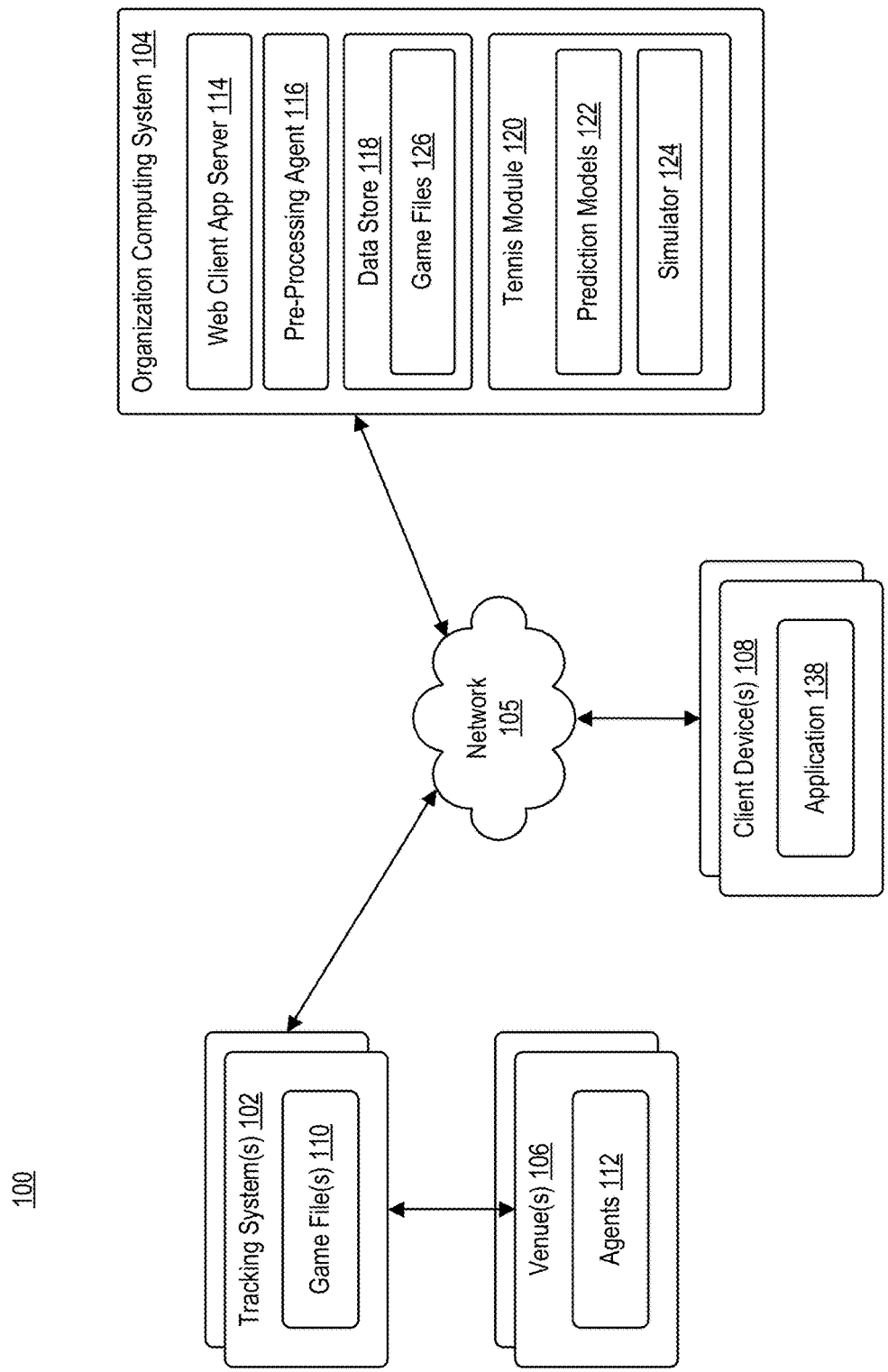
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x, y) position) for all agents and objects on the playing surface for each frame in a match file 110.

Match file 110 may be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102.

Organization computing system 104 may include at least a web client application server 114, a pre-processing agent 116, a data store 118, and one or more prediction models 122. Each of pre-processing agent 116 and prediction models 122 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more match files 126. Each match file 126 may include spatial event data and non-spatial event data. For example, spatial event data may correspond to raw data captured from a particular game or event by tracking system 102. Non-spatial event data may correspond to one or more variables describing the events occurring in a particular match without associated spatial information. For example, non-spatial event data may correspond to each play-by-play or shot-by-shot event in a particular match. In some embodiments, non-spatial event data may be derived from spatial event data. For example, pre-processing agent 116 may be configured to parse the spatial event data to derive play-by-play or shot-by-shot information. In some embodiments, non-spatial event data may be derived independently from spatial event data. For example, an administrator or entity associated with organization computing system may analyze each match to generate such non-spatial event data. As such, for purposes of this application, event data may correspond to spatial event data and non-spatial event data.

In some embodiments, each match file 126 may further include match state information. Match state information may include scoring data such as, but not limited to, game scores (e.g., 0, 15, 30, 40, deuce, advantage), set scores (e.g., 0-6 or tie-break to 7), and match scores (e.g., 0, 1, 2 or 0-3 in men's grand slams) at each point of a match. In some embodiments, each match file 126 may further include match-stats and features. Exemplary match-stats and features may include, but are not limited to, a number of aces, winners, forced errors, first/second serve percentage, double faults, forehand winners, backhand winners, volleys during the match, and the like.

Pre-processing agent 116 may be configured to process data retrieved from data store 118. For example, pre-processing agent 116 may be configured to generate one or more sets of information that may be used to train portions of prediction models 122.

Tennis module 120 may be configured to generate one or more metrics before a match or within a match. Tennis module 120 may include prediction models 122 and a simulator 124. Prediction models 122 may be representative of a liner or non-linear model. For example, prediction models 122 may be representative of a random decision forest model. Prediction models 122 may be trained to generate the various predictions both before a match or within a match. For example, prediction models 122 may be trained using a historical match data taken from a plurality of match files 126. As output, prediction models 122 may generate one or more metrics associated with scoring data at a game-level, a set-level, and/or a match-level.

Exemplary inputs to prediction models 122 may include, but are not limited to, match-state information, match-stats and features, momentum, player one strength, player two strength, player one style, player two style, court-type, weather conditions, and the like. Match-state information may correspond to current game information (e.g., 0, 15, 30, deuce, advantage, etc.), set information (0-6 or 0-7), match score information (e.g., 0-2 or 0-3), and serve information (e.g., player one or player two).

Match stats and features may correspond to a number of aces, winners, forced errors, unforced errors, player one serve percentage, player two serve percentage, double faults, forehand winners, backhand winners, volleys during the match, and the like.

In some embodiments, momentum may correspond to a change in win-probability. In some embodiments, momentum may correspond to how many of the last X points (e.g., last 10 points) the player (player one or player two) has won.

In some embodiments, player one strength may correspond to a relative player ranking or seeding. In some embodiments, player one strength may be derived from recent detailed player statistics and/or pre-game market odds from a sports book or other crowdsourced method. In some embodiments, player two strength may correspond to a relative player ranking or seeding. In some embodiments, player two strength may be derived from recent detailed player statistics and/or pre-game market odds from a sports book or other crowdsourced method. In some embodiments, player strength data may be derived or calculated from spatial data. For example, player strength data may be derived or calculated from RunningBall data available from STATS Perform, another third party data stream provider, or from tracking obtained by tracking system 102.

In some embodiments, player one style may be derived from player one statistics. In some embodiments, player one style may be derived from spatial information of player one's behavior (e.g., heat maps). In some embodiments, player one style may be derived using player one/ball tracking data for fine-grained analysis. In some embodiments, player two style may be derived from player two statistics. In some embodiments, player two style may be derived from spatial information of player two's behavior (e.g., heat maps). In some embodiments, player two style may be derived using player two/ball tracking data for fine-grained analysis. In some embodiments, player style data may be derived or calculated from spatial data. For example, player style data may be derived or calculated from RunningBall data available from STATS Perform, another third party data stream provider, or from tracking obtained by tracking system 102.

In some embodiments, court type may correspond to a playing surface on which the match is occurring (e.g., clay, grass, hard, etc.). In some embodiments, court type may further include information about the state of the playing surface (e.g., court temperature, how worn the grass is, etc.). In some embodiments, weather conditions may correspond to the current weather (e.g., outside temperature, sun location, wind, humidity, etc.).

In some embodiments, inputs to tennis module 120 may be interactive. For example, a user of client device 108 may manually enter in any possible score for prediction models 122 to predict the probabilities of next point, game, set, and/or match via an interactive interface (e.g., widget), chat bot, smart assistant, speech recognizer, or other interactive means.

Exemplary outputs from prediction models 122 may include, but are not limited to: a prediction of what player will win the next point (e.g., 0 or 1), a final score prediction (e.g., multi-class classifier such as {4-0, 4-1, 4-2, 4-3, 0-4, 1-4, 2-4, 3-4}), a final set score prediction (e.g., multi-set classifier such as {6-0, 6-1, 6-2, 6-3, 6-5, 7-5, 7-6, and the reverse}), a final tie break score prediction (e.g., multi-class classifier such as {7-0, 7-1, 7-2, 7-3, 7-4, 7-5, 8-6, and beyond, and reverse}), and/or a final game score prediction (e.g., multi-class classifier such as {2-0, 2-1, 0-2, 1-2, etc.}). In some embodiments, exemplary outputs from prediction models 122 may further include predicted final player statistics (e.g., save percentage, number of aces, number of winners, etc.), predicted serve location or first serve, second serve, "let," double fault, predicted winner location and winner type (e.g., forehand, backhand, volley, smash, etc.), and rally-count.

In some embodiments, the outputs from prediction models 122 may allow prediction models 122 to generate one or more additional metrics. In some embodiments, prediction models 122 may generate one or more clutch metrics. For example, looking at key moments during a match, prediction models 122 may identify those points of the match that could yield a greater than 10% (or x %) change in win-probability. To do so, prediction models 122 may leverage a simulator 124. Simulator 124 may take one or more inputs (e.g., inputs to prediction models 122 and/or outputs from prediction models 122) to identify these points. Once these points are identified, prediction models 122 may identify those players that perform the best in these pressure situations.

In some embodiments, tennis module 120 may be configured to perform a what-if analysis for breakpoints. For example, using simulator 124, tennis module 120 may generate a metric that captures the impact on the match probability when a plyer breaks a serve. For example, simulator 124 may compare current win percentage to the impact of winning the breakpoint and/or the current win percentage to the impact of losing the breakpoint. In some embodiments, such output may take the form of a live graphic.

In some embodiments, tennis module 120 may be configured to generate a momentum metric based on the outputs from prediction models 122. In some embodiments, momentum may be defined as the current win probability (or set-win-probability) and its change over the last X points (e.g., 10 points).

In some embodiments, tennis module 120 may be configured to generate a player plus/minus based on the outputs from prediction models 122. For example, based on one or more pre-game match predictions, tennis module 120 may look at the difference between how many points the player is expected to win and how many points the player did win.

In some embodiments, tennis module 120 may be configured to generate a rally excitement index. The rally excitement index may be a ranking from 0 to 10, for example, that qualifies every individual rally in a game or match. Such ranking may be subsequently leveraged by end users for searching for clips of highlights or the automatic generation of highlights. In some embodiments, tennis module 120 may generate such rally excitement index by utilizing one or more of spatial data (e.g., running ball data, rally count information, shot type, importance information (e.g., current score), and the like) and tracking information (e.g., location of individual shots, shot speed, rally count, etc.).

In some embodiments, tennis module 120 may be configured to generate a rally index. A rally index may refer to shot-by-shot updates of the rally win prediction that may be used to tell a story about the rally. Such rally index may be used to generate highlight clips.

In some embodiments, tennis module 120 may be configured to generate a shot location predictor. A shot location predictor may be a prediction of where the next shot will land. In some embodiments, shot location predictor may take the form of a visualization via one or more broadcast graphics that may be overlaid on the video. In some embodiments, the visualization may be used as a post-match clip by highlighting a heat map.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 138. Application 138 may be representative of a web browser that allows access to a website or a stand-alone application. Client device 108 may access application 138 to access one or more functionalities of organization computing system 104. Client device 108 may communicate over network 105 to request a webpage, for example, from web client application server 114 of organization computing system 104. For example, client device 108 may be configured to execute application 138 to access fan engagement functionality around the various predictions generated by tennis module 120. In some embodiments, application 138 may take the form of a second screen application or a standalone widget, which may be embedded into existing channels. In some embodiments, application 138 may allow a user to enter interactive inputs for analysis by tennis module 120.

Figure 2:
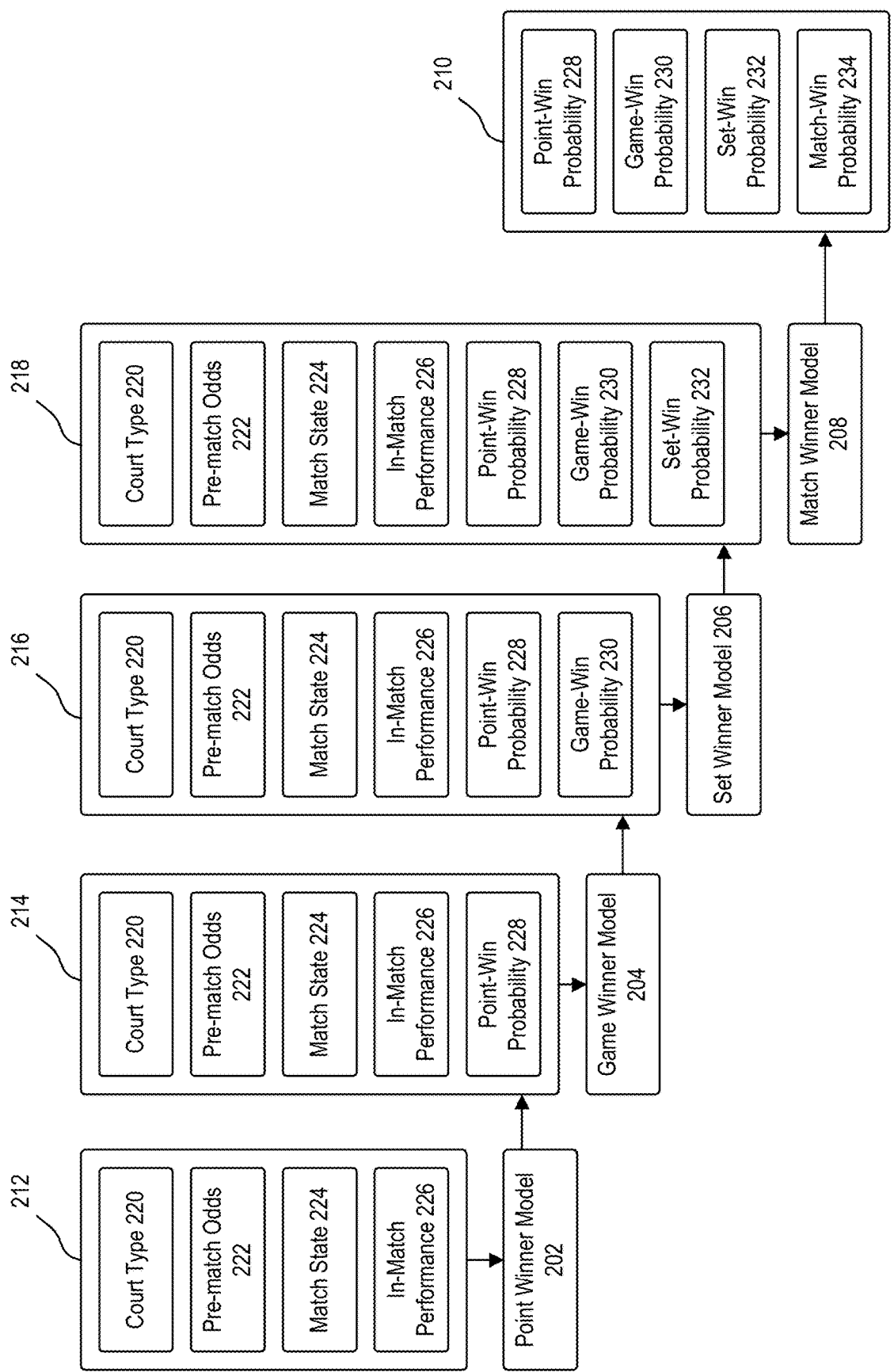
FIG. 2 is a block diagram illustrating prediction models, according to example embodiments.

FIG. 2 is a block diagram illustrating prediction models 122, according to example embodiments. As shown, prediction models 122 may include point winner model 202, game winner model 204, set winner model 206, and match winner model 208. In some embodiments, each of point winner model 202, game winner model 204, set winner model 206, and match winner model 208 may take the form of a gradient boosting tree model.

Point winner model 202 may be configured to predict whether a player will win the next point based on various inputs 212. As shown, inputs 212 may include court type 220 (e.g., grass, clay, hard), pre-match odds 222, and match state 224 (e.g., current game and set score), in-match statistics 226 (e.g., difference in points won, games won, breaks won in the current game, set, and match, serve percentages, return percentages, etc.). Such inputs 212 may be generated by pre-processing agent 116. Point winner model 202 may be trained to predict the outcome of the next point based on inputs 212. For example, the output from point winner model 202 may be a point-win probability 228, which provides a probability of the player winning the next point.

Game winner model 204 may be configured to predict whether the player will win the current game and/or the next game based on various inputs 214. As shown, inputs 214 may be similar to inputs 212. For example, inputs 214 may similarly include court type 220, pre-match odds 222, match state 224, and in-match statistics 226. However, because game winner model 204 is downstream of point winner model in the chain of models, inputs 214 may also include the output from point winner model 202, i.e., point-win probability 228. Such inputs 214 may be generated by pre-processing agent 116. Game winner model 204 may be trained to predict the outcome of the game based on inputs 214. For example, the output from game winner model 204 may be a game-win probability 230, which provides a probability of the player winning the game.

Set winner model 206 may be configured to predict whether the player will win the current set and/or the next set based on various inputs 216. As shown, inputs 216 may be similar to inputs 214. For example, inputs 216 may similarly include court type 220, pre-match odds 222, match state 224, and in-match statistics 226. However, because set winner model 206 is downstream of point winner model 202 and game winner model 204 in the chain of models, inputs 216 may also include the output from point winner model 202, i.e., point-win probability 228, and the output from game winner model 204, i.e., game-win probability 230. Such inputs 214 may be generated by pre-processing agent 116. Set winner model 206 may be trained to predict the outcome of the set based on inputs 216. For example, the output from set winner model 206 may be a set-win probability 232, which provides a probability of the player winning the set.

Match winner model 208 may be configured to predict whether the player will win the current match and/or the next match based on various inputs 218. As shown, inputs 218 may be similar to inputs 216. For example, inputs 218 may similarly include court type 220, pre-match odds 222, match state 224, and in-match statistics 226. However, because match winner model 208 is downstream of point winner model 202, game winner model 204, and set winner model 206 in the chain of models, inputs 218 may also include the output from point winner model 202, i.e., point-win probability 228, the output from game winner model 204, i.e., game-win probability 230, and the output from set winner model 206, i.e., set-win probability 232. Such inputs 218 may be generated by pre-processing agent 116. Match winner model 208 may be trained to predict the outcome of the set based on inputs 218. For example, the output from match winner model 208 may be a match-win probability 234, which provides a probability of the player winning the match.

As shown, as output, prediction models 122 may generate outputs 210. Outputs 210 may include point-win probability 228, game-win probability 230, set-win probability 232, and match-win probability 234.

Figure 3:
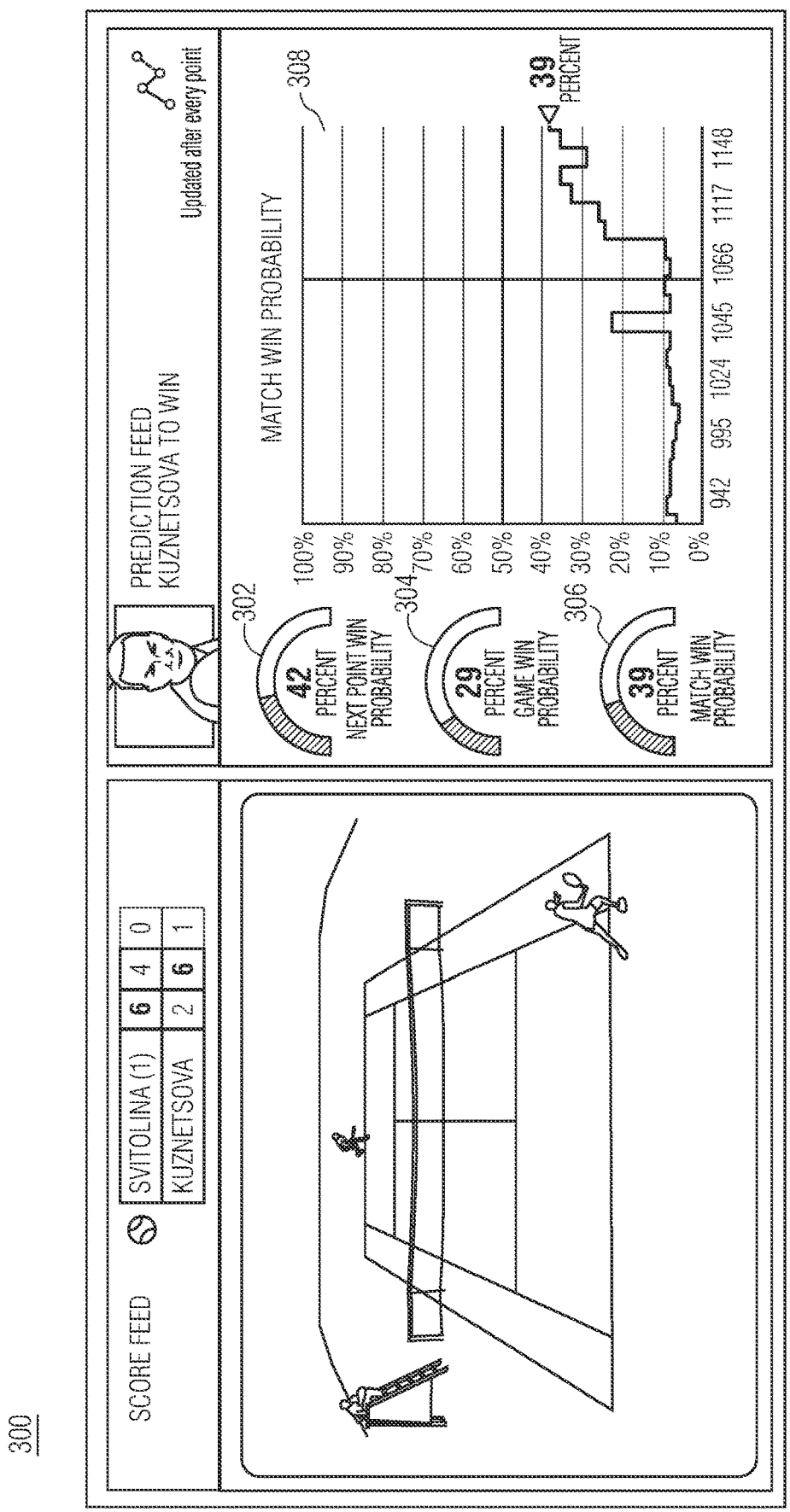
FIG. 3 illustrates an exemplary graphical user interface (GUI), according to example embodiments.

FIG. 3 illustrates an exemplary graphical user interface (GUI) 300, according to example embodiments. As shown, GUI 300 may provide an exemplary win probability graphic corresponding to a predicted win probability generated by prediction models 122. The win probability graphic includes a next point win probability graphic 302, a game win probability graphic 304, and a match win probability graphic 306. Further, in some embodiments, the win probability graphic may further include a chart illustrating 308 the match win probability for Kuznetsova over the courts of the match.

Figure 4:
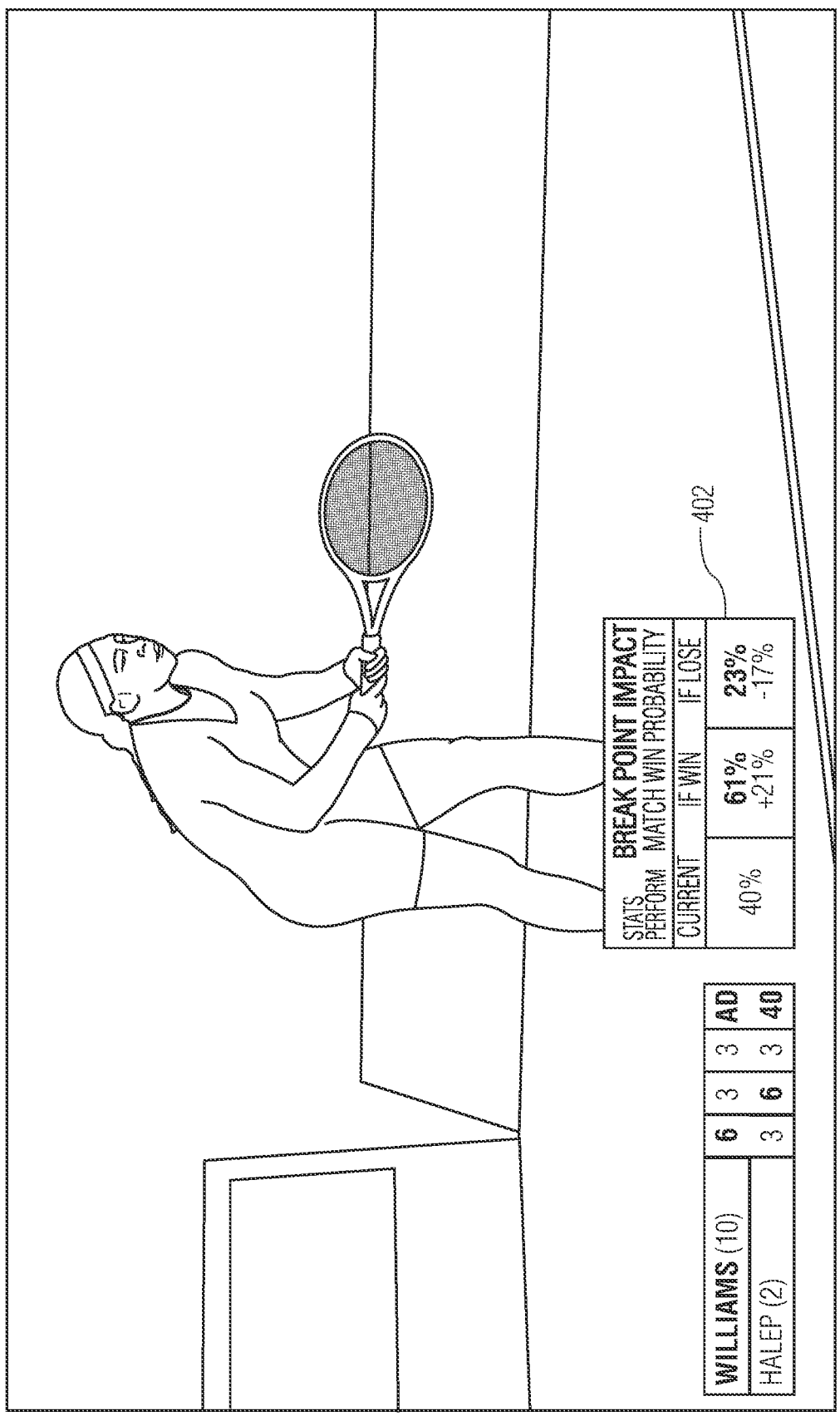
FIG. 4 illustrates an exemplary graphical user interface (GUI), according to example embodiments.

FIG. 4 illustrates an exemplary graphical user interface (GUI) 400, according to example embodiments. As shown, GUI 400 may include a break-point analysis graphic 402. Break-point analysis graphic 402 is shown overlaying a broadcast video stream of the match. For example, break-point analysis graphic 402 may be displayed in real-time, or near real-time, to the user while the user is watching the match. Break-point analysis graphic 402 may show the impact on the match win probability for the player if he or she wins the next point. As provided above, tennis module 120 may be configured to generate such a metric and break-point analysis graphic 402 representing the metric.

Figure 5:
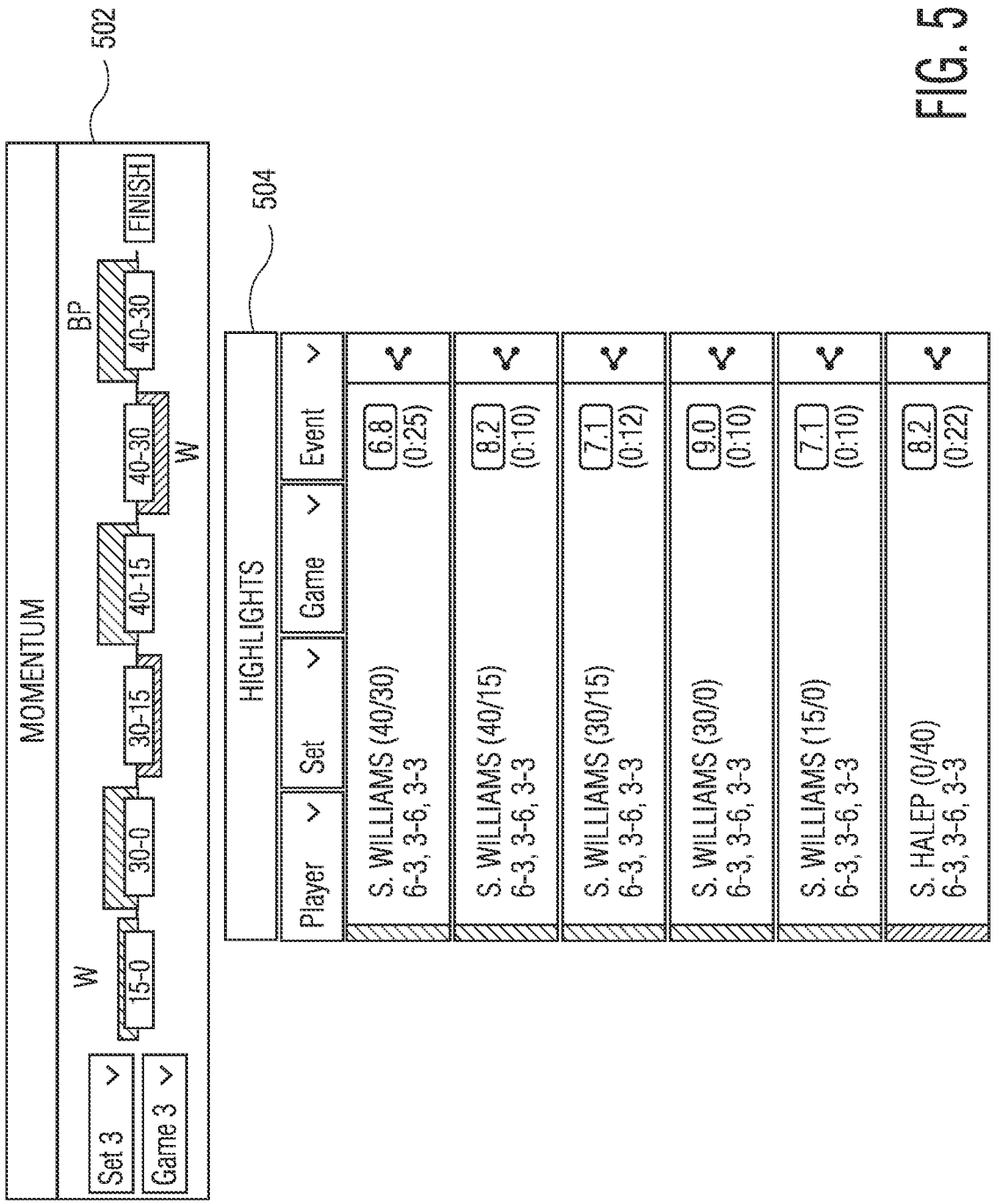
FIG. 5 illustrates an exemplary graphical user interface (GUI), according to example embodiments.

FIG. 5 illustrates an exemplary graphical user interface (GUI) 500, according to example embodiments. As shown, GUI 500 may include a momentum graphic 502. Momentum graphic 502 may be a visual representation corresponding to the rally excitement index generated by tennis module 120. In some embodiments, GUI 500 may further include a highlight list 504. Highlight list 504 may be automatically generated to include various clips of the game or match that exceed a threshold momentum or rally excitement index threshold.

Figure 6A:
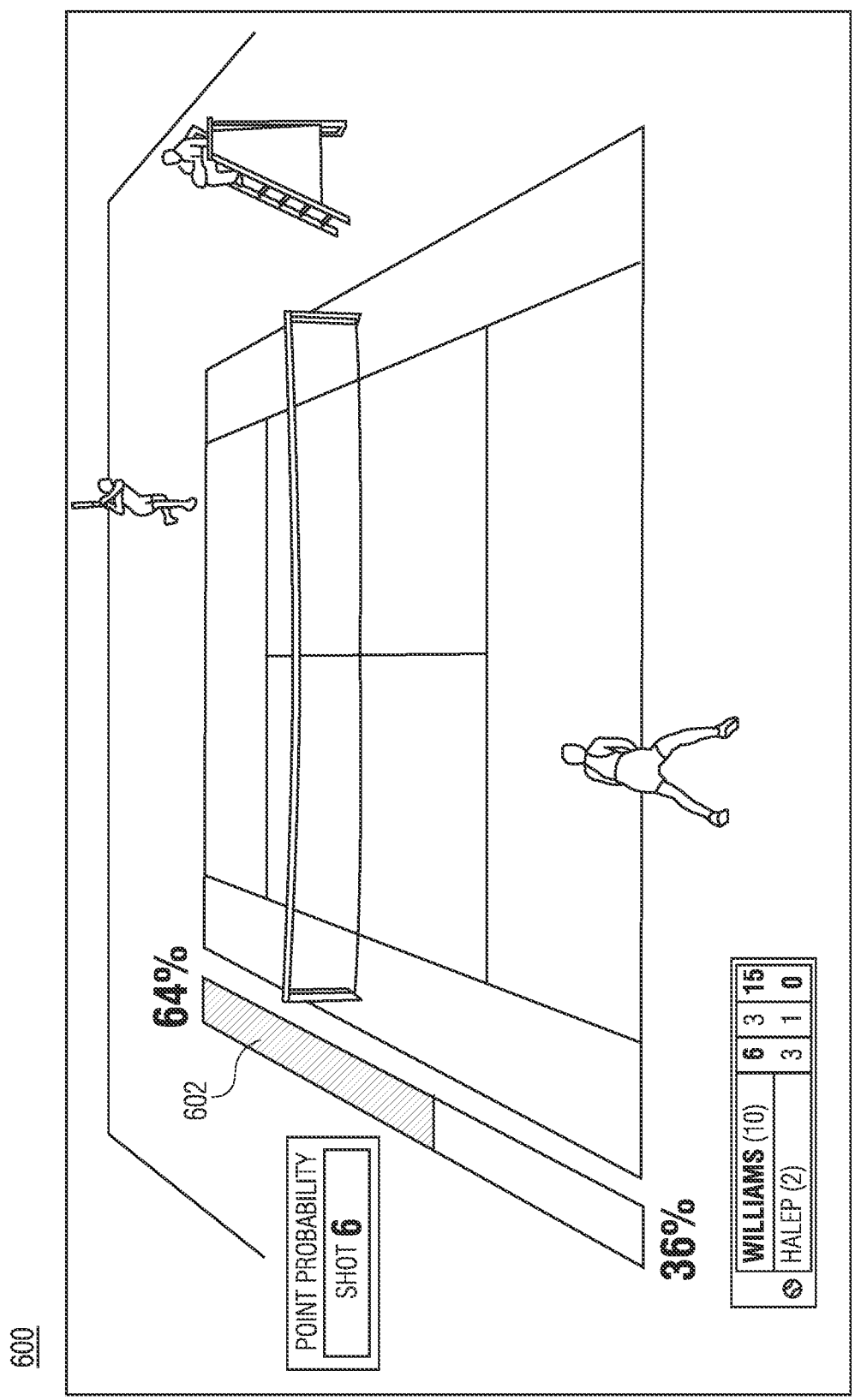
FIG. 6A illustrates an exemplary graphical user interface (GUI), according to example embodiments.

FIG. 6A illustrates an exemplary graphical user interface (GUI) 600, according to example embodiments. As shown, GUI 600 may include a rally index graphic 602 overlaying a broadcast video feed of the match. Rally index graphic 602 may be visual representation corresponding to the rally index generated by tennis module 120.

Figure 6B:
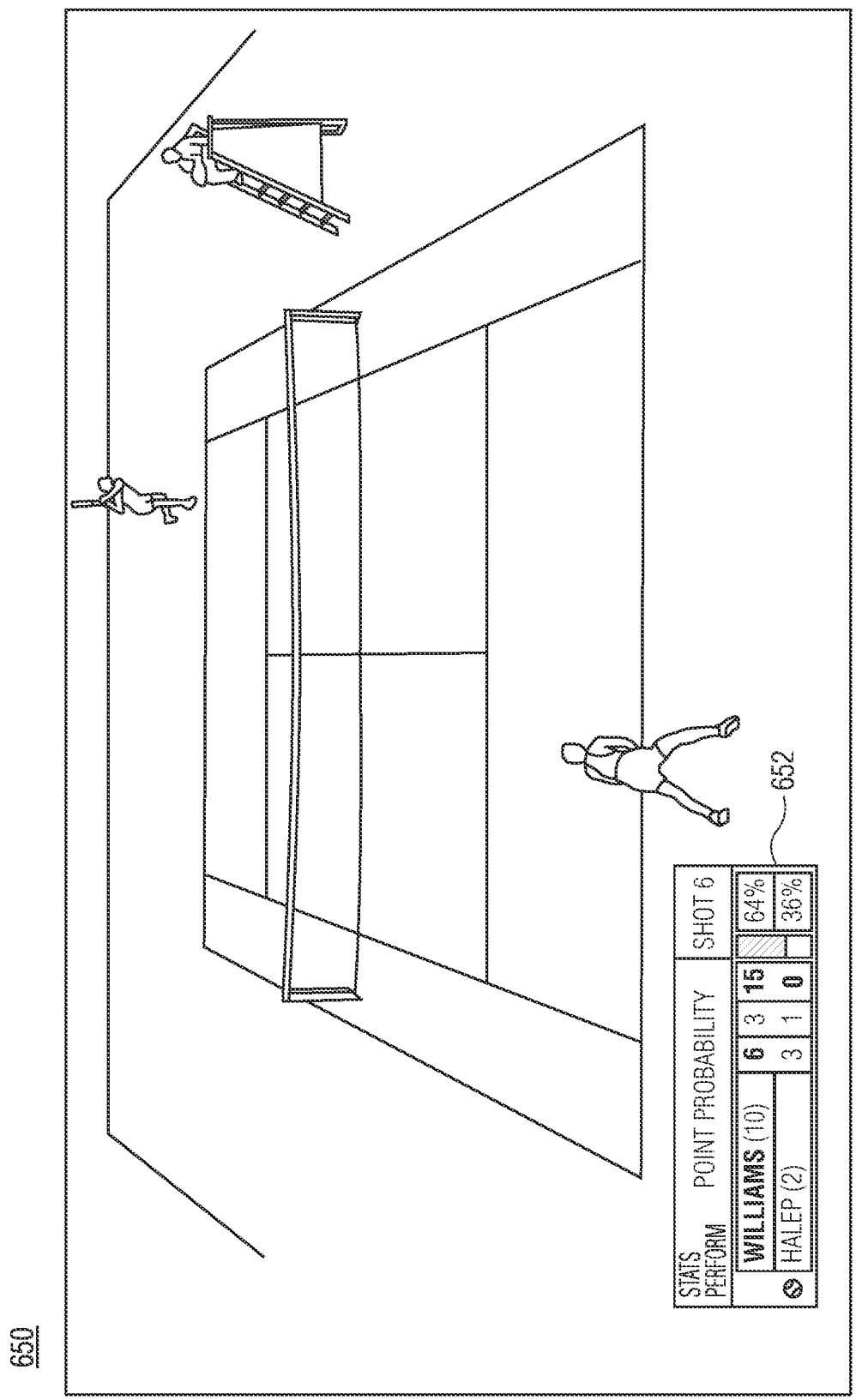
FIG. 6B illustrates an exemplary graphical user interface (GUI), according to example embodiments.

FIG. 6B illustrates an exemplary graphical user interface (GUI) 650, according to example embodiments. As shown, GUI 650 may include a rally index graphic 652. Rally index graphic 652 may be visual representation corresponding to the rally index generated by tennis module 120. As shown, rally index graphic 652 is overlaid onto the broadcast of the match.

Figure 7A:
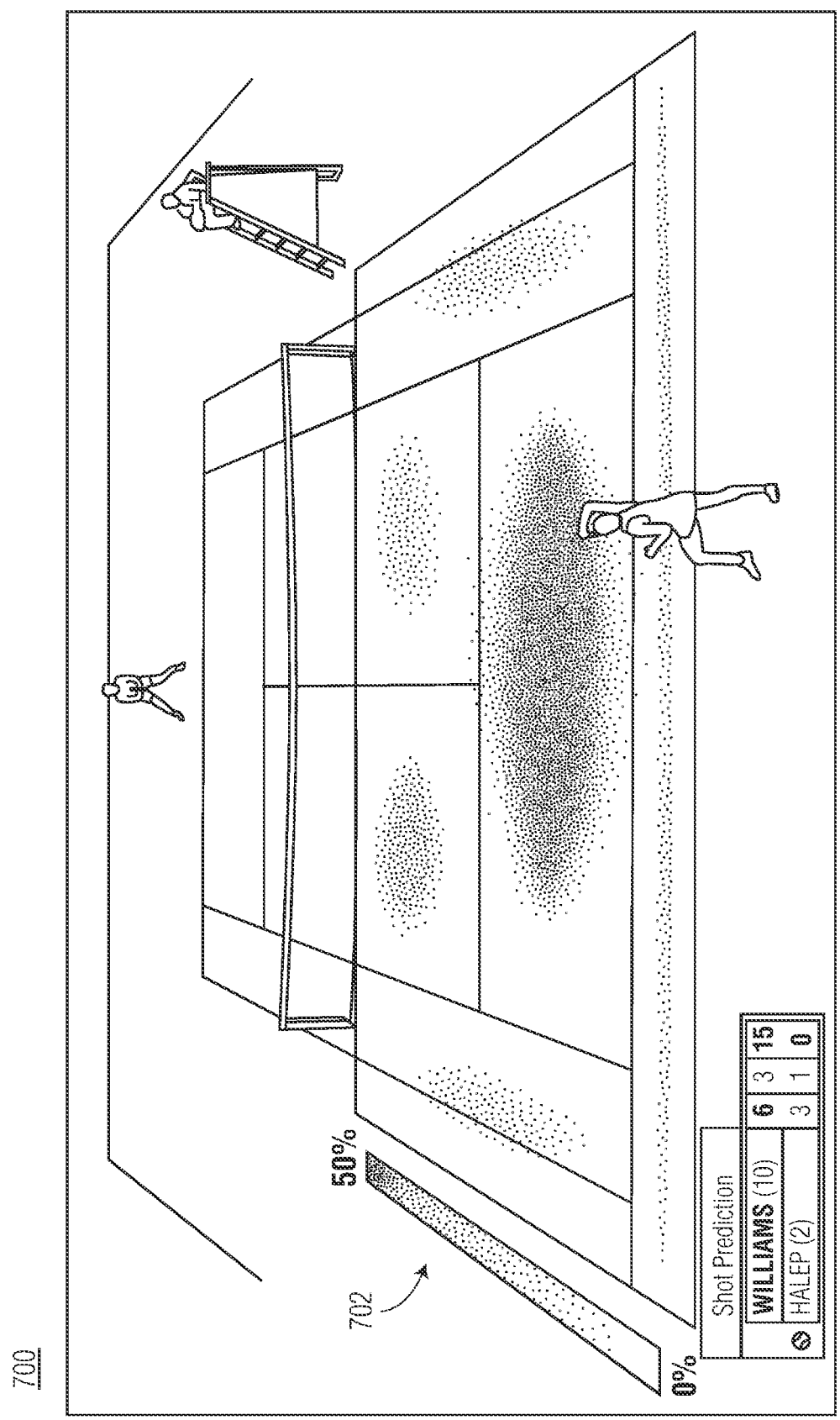
FIG. 7A illustrates an exemplary graphical user interface (GUI), according to example embodiments.

FIG. 7A illustrates an exemplary graphical user interface (GUI) 700, according to example embodiments. As shown, GUI 700 may include a visual indication 702 corresponding to a shot location prediction of where the next shot will land. Visual indication 702 of the shot location prediction may correspond to the prediction generated by tennis module 120. As shown, visual indication 702 may be overlaid onto the broadcast of the match.

Figure 7B:
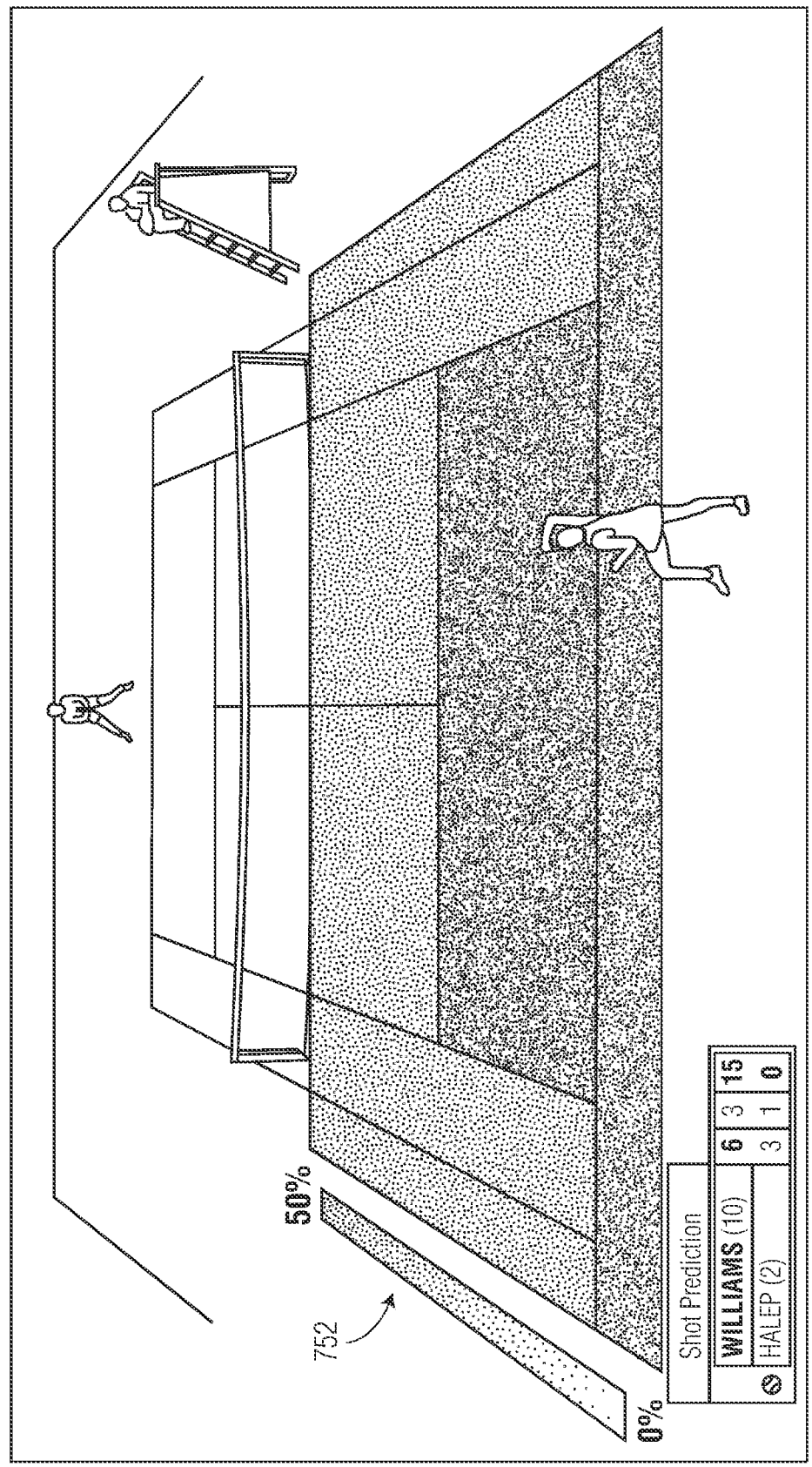
FIG. 7B illustrates an exemplary graphical user interface (GUI), according to example embodiments.

FIG. 7B illustrates an exemplary graphical user interface (GUI) 750, according to example embodiments. As shown, GUI 750 may include a visual indication 752 corresponding to a shot location prediction of where the next shot will land. Visual indication 752 of the shot location prediction may correspond to the prediction generated by tennis module 120. As shown, visual indication 752 may be overlaid onto the broadcast of the match.

Figure 8:
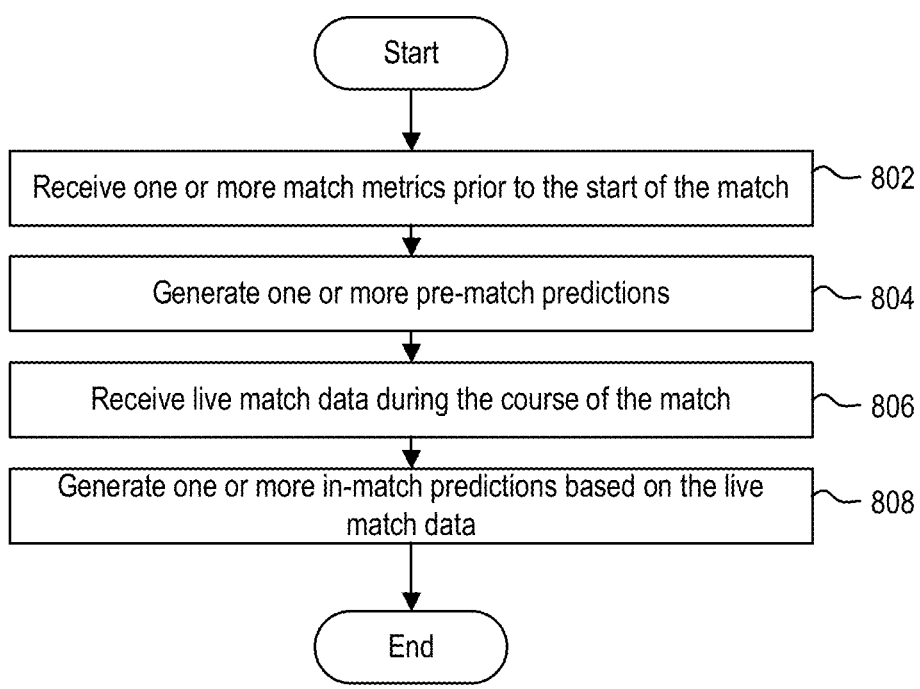
FIG. 8 is a flow diagram illustrating a method of generating pre-match and in-match tennis predictions, according to example embodiments.

FIG. 8 is a flow diagram illustrating a method 800 of generating pre-match and in-match tennis predictions, according to example embodiments. Method 800 may begin at step 802.

At step 802, organization computing system 104 may receive one or more match metrics prior to the start of the match. In some embodiments, the one or more match metrics may correspond to historical match metrics for each player.

At step 804, organization computing system 104 may generate one or more pre-match predictions based on the one or more match metrics received prior to the start of the match. In some embodiments, tennis module 120 may generate the one or more pre-match prediction using prediction models 122.

At step 806, organization computing system 104 may receive live match data during the course of the match. Exemplary live match data may include, but is not limited to, match-state information, match-stats and features, momentum, player one strength, player two strength, player one style, player two style, court-type, weather conditions, and the like.

At step 808, organization computing system 104 may generate one or more in-match predictions based on the live match data. For example, tennis module 120 may generate one or more in-match predictions using prediction models 122 and/or simulator 124. Exemplary in-match predictions may include, but are not limited to, a prediction of what player will win the next point (e.g., 0 or 1), a final score prediction (e.g., multi-class classifier such as {4-0, 4-1, 4-2, 4-3, 0-4, 1-4, 2-4, 3-4}), a final set score prediction (e.g., multi-set classifier such as {6-0, 6-1, 6-2, 6-3, 6-5, 8-5, 8-6, and the reverse}), a final tie break score prediction (e.g., multi-class classifier such as {7-0, 8-1, 8-2, 8-3, 8-4, 8-5, 8-6, and beyond, and reverse}), and/or a final game score prediction (e.g., multi-class classifier such as {2-0, 2-1, 0-2, 1-2, etc.}). In some embodiments, exemplary outputs from prediction models 122 may further include predicted final player statistics (e.g., save percentage, number of aces, number of winners, etc.), predicted serve location or first serve, second serve, "let," double fault, predicted winner location and winner type (e.g., forehand, backhand, volley, smash, etc.), and rally-count. In some embodiments exemplary in-match predictions may further include a breakpoint-analysis, one or more clutch metrics, a momentum analysis, a player plus/minus, and the like.

Figure 9A:
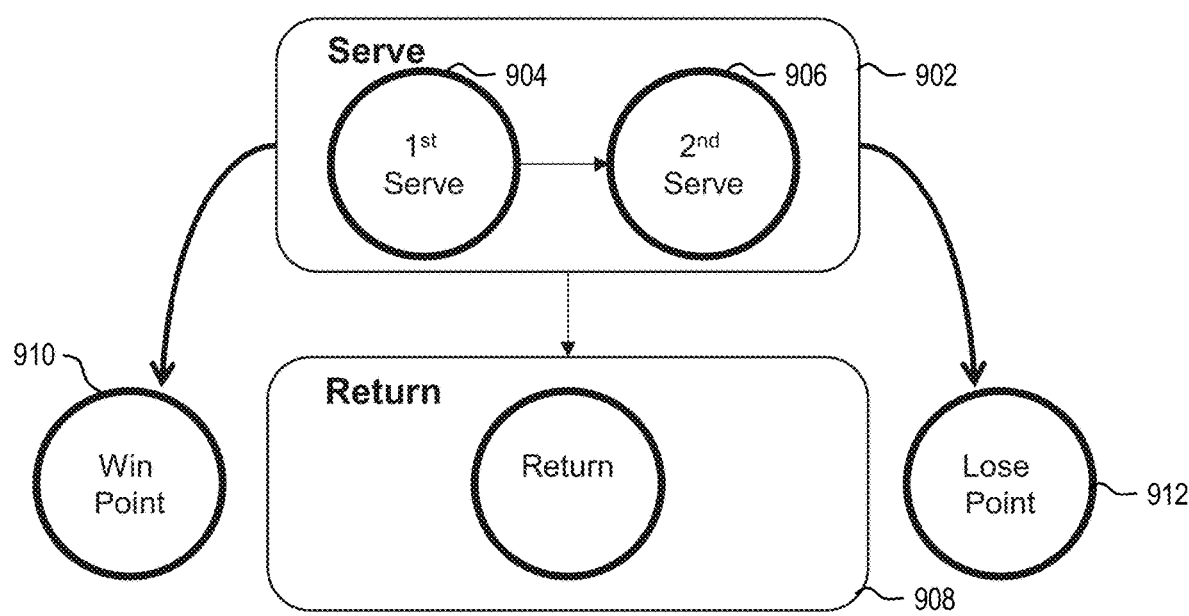
FIG. 9A is an exemplary diagram illustrating a match state of a tennis game, according to example embodiments.
Figure 9B:
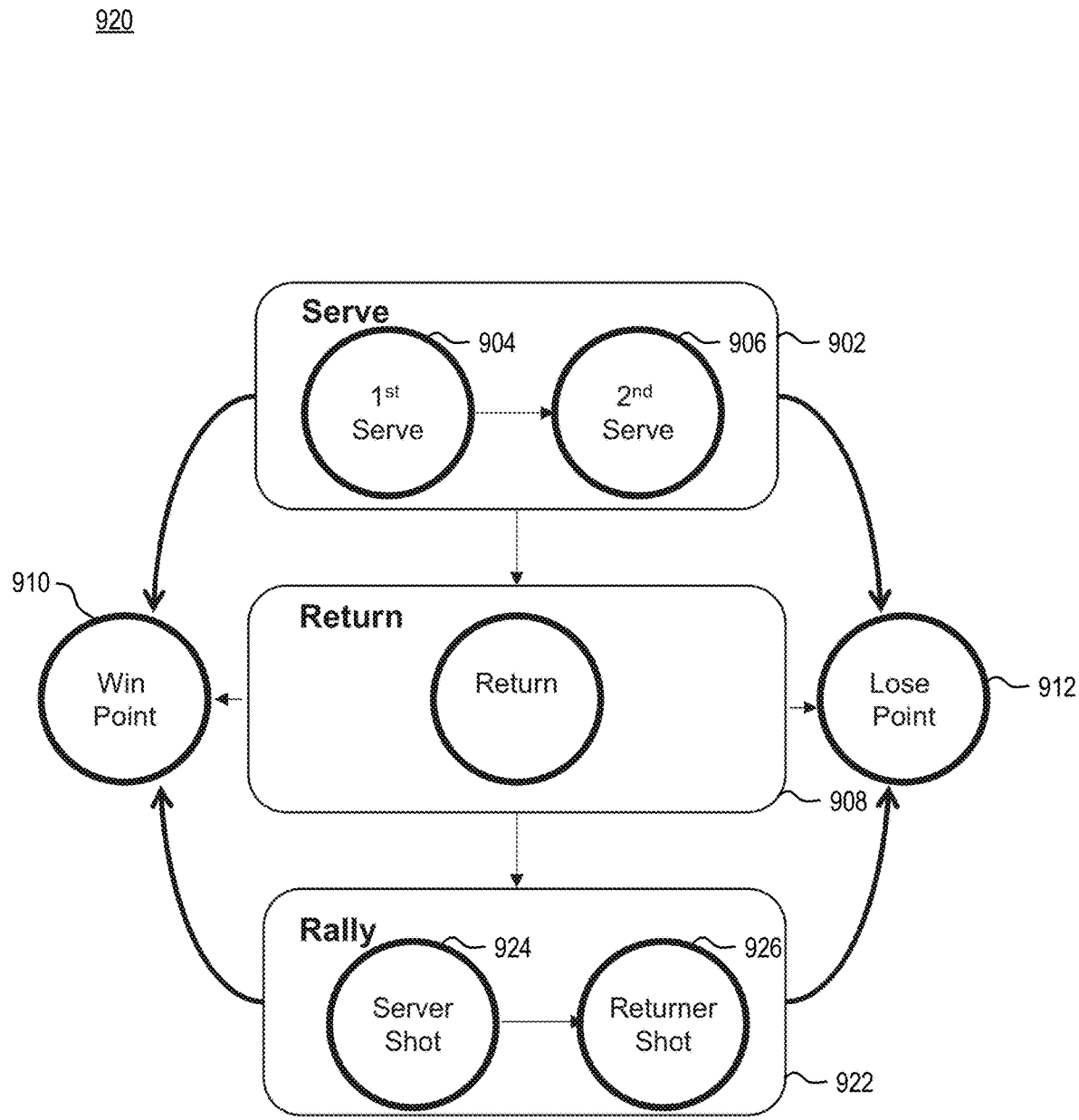
FIG. 9B is an exemplary diagram illustrating a match state of a tennis game, according to example embodiments.

FIGS. 9A-9B are exemplary diagrams illustrating match states of a tennis game, according to example embodiments.

For tennis, as those skilled in the art understand, a match typically involves two players playing to the best of three sets. In some competitions, the two players may play to the best of five sets. Each match includes a plurality of sets. Each set includes a plurality of games. Each game includes a plurality of points. When a player wins a game by more than two points, that players has won a game. When a player is the first to win a threshold number of games (e.g., at least 6), that player has won the set. A player wins the match when they win two out of three (or three out of five) sets.

FIG. 9A illustrates a first state 900 of the tennis game, according to example embodiments. As shown, a player (e.g., Player One) may serve (numeral "902") to a second player (e.g., Player Two). At this point, there are several outcomes that may occur. First, Player One may commit a fault, i.e., an illegal serve. If Player One committed a fault on first serve 904, then Player One may perform a second serve 906. If Player One faults again on second serve 906, then Player One committed what is referred to as a "double fault" and Player One loses the point 912.

If, however, Player One successfully serves first serve 904 (i.e., did not fault) or second serve 906 (i.e., did not double fault), then there may be several outcomes. In some embodiments, Player One wins a point 910 (e.g., "ace"). In some embodiments, Player Two returns 908 the serve.

FIG. 9B illustrates a second state 920 of the tennis game, according to example embodiments. In second state 920, Player Two has successfully returned the shot to Player One. At this point, several outcomes may occur. First, Player Two may return the shot and win a point against Player One. Second, Player Two may return the shot and lose a point against player one (e.g., ball is hit out of bounds). Third, a rally 922 may begin with Player One returning the returned shot to Player Two. As shown, the states may switch between a player shooting (e.g., Server Shot 924) and a player returning (e.g., Returner Shot 926) until a scoring event occurs. In other words, rally 922 may continue between Player One serving or hitting the ball to Player Two and Player Two returning the ball to Player One until Player One or Player Two scores a point.

Once a point is scored, the game state may return to first state 900 for a new point to begin.

Figure 10A:
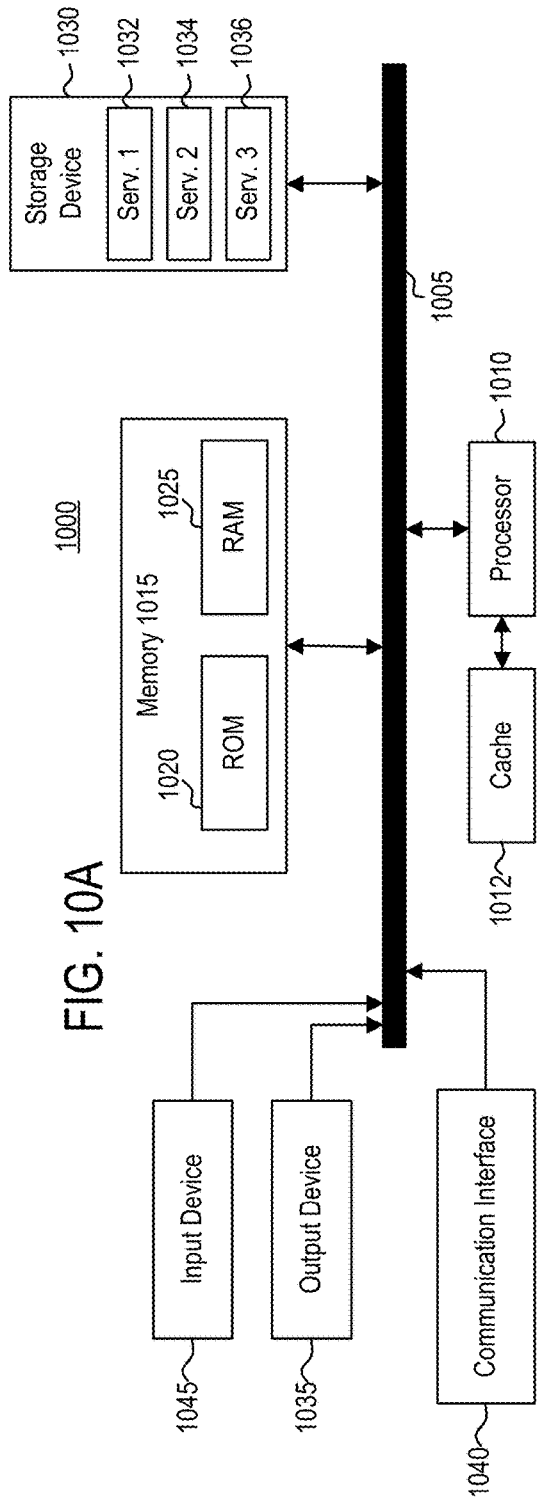
FIG. 10A is a block diagram illustrating a computing device, according to example embodiments.

FIG. 10A illustrates a system bus architecture of computing system 1000, according to example embodiments. System 1000 may be representative of at least a portion of organization computing system 104. One or more components of system 1000 may be in electrical communication with each other using a bus 1005. System 1000 may include a processing unit (CPU or processor) 1010 and a system bus 1005 that couples various system components including the system memory 1015, such as read only memory (ROM) 1020 and random access memory (RAM) 1025, to processor 1010. System 1000 may include a cache of high-speed memory connected directly with, in close proximity to, or integrated as part of processor 1010. System 1000 may copy data from memory 1015 and/or storage device 1030 to cache 1012 for quick access by processor 1010. In this way, cache 1012 may provide a performance boost that avoids processor 1010 delays while waiting for data. These and other modules may control or be configured to control processor 1010 to perform various actions. Other system memory 1015 may be available for use as well. Memory 1015 may include multiple different types of memory with different performance characteristics. Processor 1010 may include any general purpose processor and a hardware module or software module, such as service 1 1032, service 2 1034, and service 3 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 may represent any number of input mechanisms, such as a microphone for speech, a touch-sensitive screen for gesture or graphical input, keyboard, mouse, motion input, speech and so forth. An output device 1035 may also be one or more of a number of output mechanisms known to those of skill in the art. In some instances, multimodal systems may enable a user to provide multiple types of input to communicate with computing system 1000. Communications interface 1040 may generally govern and manage the user input and system output. There is no restriction on operating on any particular hardware arrangement and therefore the basic features here may easily be substituted for improved hardware or firmware arrangements as they are developed.

Storage device 1030 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1025, read only memory (ROM) 1020, and hybrids thereof.

Storage device 1030 may include services 1032, 1034, and 1036 for controlling the processor 1010. Other hardware or software modules are contemplated. Storage device 1030 may be connected to system bus 1005. In one aspect, a hardware module that performs a particular function may include the software component stored in a computer-readable medium in connection with the necessary hardware components, such as processor 1010, bus 1005, output device 1035 (e.g., display), and so forth, to carry out the function.

Figure 10B:
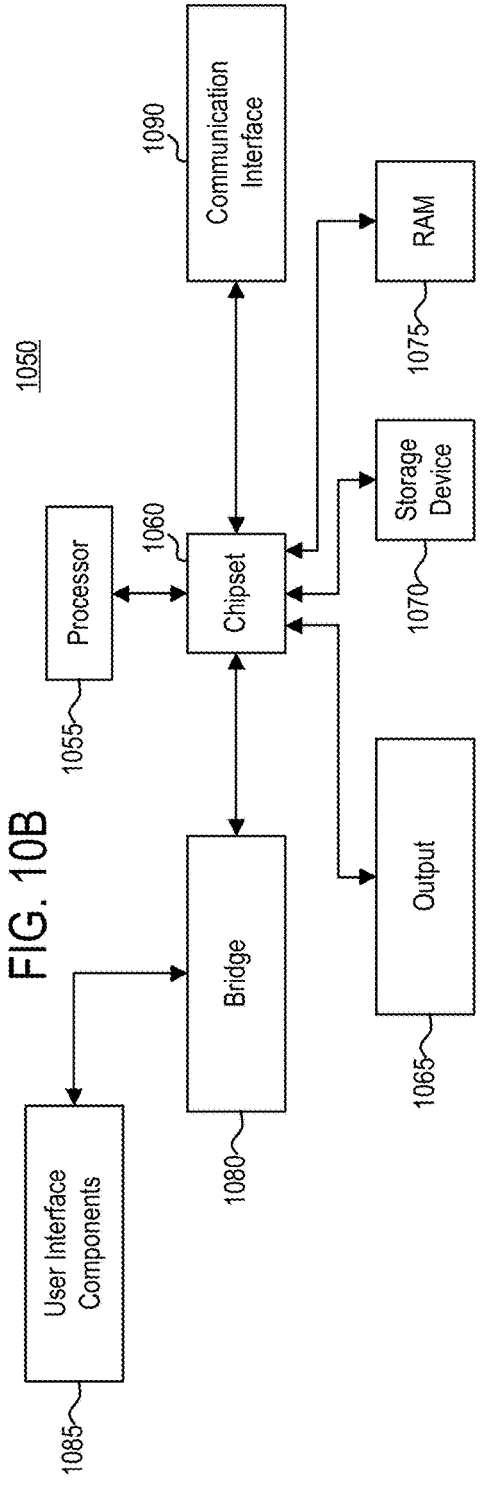
FIG. 10B is a block diagram illustrating a computing device, according to example embodiments.

FIG. 10B illustrates a computer system 1050 having a chipset architecture that may represent at least a portion of organization computing system 104. Computer system 1050 may be an example of computer hardware, software, and firmware that may be used to implement the disclosed technology. System 1050 may include a processor 1055, representative of any number of physically and/or logically distinct resources capable of executing software, firmware, and hardware configured to perform identified computations. Processor 1055 may communicate with a chipset 1060 that may control input to and output from processor 1055. In this example, chipset 1060 outputs information to output 1065, such as a display, and may read and write information to storage device 1070, which may include magnetic media, and solid state media, for example. Chipset 1060 may also read data from and write data to storage device 1075 (e.g., RAM). A bridge 1080 for interfacing with a variety of user interface components 1085 may be provided for interfacing with chipset 1060. Such user interface components 1085 may include a keyboard, a microphone, touch detection and processing circuitry, a pointing device, such as a mouse, and so on. In general, inputs to system 1050 may come from any of a variety of sources, machine generated and/or human generated.

Chipset 1060 may also interface with one or more communication interfaces 1090 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1055 analyzing data stored in storage device 1070 or storage device 1075. Further, the machine may receive inputs from a user through user interface components 1085 and execute appropriate functions, such as browsing functions by interpreting these inputs using processor 1055.

It may be appreciated that example systems 1000 and 1050 may have more than one processor 1010 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
 tracking, by a computing system, via at least one calibrated camera and at least one tag, one or more motions of a first player and a second player on a playing surface and one or more objects;
 based on the tracking, storing, by the computing system, at least one player identity corresponding to the first player and the second player and positional information corresponding to the first player, the second player, and the one or more objects as pre-match data in a data store;
 receiving, by the computing system, the pre-match data for a match between the first player and the second player from a data store, the pre-match data comprising player strength information for the first player and the second player, player style information for the first player and the second player, a playing surface type, or one or more weather conditions;
 generating, by the computing system using one or more prediction models, a pre-match prediction based on the pre-match data, wherein the pre-match prediction includes one or more metrics associated with scoring data at a game-level, a set-level, and/or a match level;
 receiving, by the computing system, in-match data for the match currently in progress, wherein the in-match data comprises one or more of match-state information, match-statistics and features, momentum, the player strength information for the first player and the second player, the player style information for the first player and the second player, the playing surface type, or one or more updated weather conditions;
 generating, by the computing system using the one or more prediction models, a live match prediction based on the in-match data and the pre-match prediction;
 utilizing, by the computing system, a simulator to generate an additional metric based on the live match prediction, wherein the additional metric includes one or more match events that indicate a change in win-probability greater than a threshold;
 identifying, by the computing system using the one or more prediction models, at least one player that has a best performance during the one or more match events based on the additional metric; and
 outputting, by the computing system, a visual representation corresponding to the live match prediction and the at least one player on a display.

2. The method of claim 1, wherein generating, by the computing system using the one or more prediction models, the live match prediction comprises:
 generating one or more of a prediction of what player will win a next point, a final score prediction, a final set score prediction, a final tie break score prediction, a final game score prediction, final player statistics, predicted serve, predicted winner location, predicted winner type, or rally-count.

3. The method of claim 1, further comprising:
 receiving, by the computing system, input from a user device, wherein the input provides a possible score for the match; and
 generating, by the computing system, updated predictions based on the input from the user device.

4. The method of claim 1, wherein the player strength information for the first player and the player strength information for the second player are derived from spatial data of the match.

5. The method of claim 1, wherein player style information for the first player and the player style information for the second player are derived from spatial data of the match.

6. The method of claim 1, further comprising:
 generating, by the computing system, a momentum metric based on the live match prediction, wherein the momentum metric represents a change in current win probability over a set amount of points.

7. The method of claim 1, wherein utilizing, by the computing system, the simulator to generate the additional metric based on the live match prediction further comprises:
 generating, by the computing system via the simulator, a clutchness metric based on the live match prediction, wherein the clutchness metric is based on points of the match that yield a greater than the threshold.

8. The method of claim 1, further comprising:
 generating, by the computing system, a plus-minus metric for the first player and the second player based on the live match prediction, wherein the plus-minus metric represents a difference between how many points the first player is expected to win and the second player is expected to win and how many points the first player won and how many points the second player did win.

9. The method of claim 1, wherein the at least one tag includes a tag worn by the first player or the second player or wherein the at least one tag includes an embedded tag in at least one of the one or more objects.

10. A non-transitory computer readable medium comprising one or more sequences of instructions, which, when executed by a processor, causes a computing system to perform operations comprising:
tracking, by a computing system, via at least one calibrated camera and at least one tag, one or more motions of a first player and a second player on a playing surface and one or more objects;
based on the tracking, storing, by the computing system, at least one player identity corresponding to the first player and the second player and positional information corresponding to the first player, the second player, and the one or more objects as pre-match data in a data store;
receiving, by the computing system, the pre-match data for a match between the first player and the second player from a data store, the pre-match data comprising player strength information for the first player and the second player, player style information for the first player and the second player, a playing surface type, or one or more weather conditions;
generating, by the computing system using one or more prediction models, a pre-match prediction based on the pre-match data, wherein the pre-match prediction includes one or more metrics associated with scoring data at a game-level, a set-level, and/or a match level;
receiving, by the computing system, in-match data for the match currently in progress, wherein the in-match data comprises one or more of match-state information, match-statistics and features, momentum, the player strength information for the first player and the second player, the player style information for the first player and the second player, the playing surface type, or one or more updated weather conditions;
generating, by the computing system using the one or more prediction models, a live match prediction based on the in-match data and the pre-match prediction;
utilizing, by the computing system, a simulator to generate an additional metric based on the live match prediction, wherein the additional metric includes one or more match events that indicate a change in win-probability greater than a threshold;
identifying, by the computing system using the one or more prediction models, at least one player that has a best performance during the one or more match events based on the additional metric; and
outputting, by the computing system, a visual representation corresponding to the live match prediction and the at least one player on a display.

11. The non-transitory computer readable medium of claim 10, wherein generating, by the computing system using the one or more prediction models, the live match prediction comprises:
generating one or more of a prediction of what player will win a next point, a final score prediction, a final set score prediction, a final tie break score prediction, a final game score prediction, final player statistics, predicted serve, predicted winner location, predicted winner type, or rally-count.

12. The non-transitory computer readable medium of claim 10, further comprising:
receiving, by the computing system, input from a user device, wherein the input provides a possible score for the match; and
generating, by the computing system, updated predictions based on the input from the user device.

13. The non-transitory computer readable medium of claim 10, wherein the player strength information for the first player and the player strength information for the second player are derived from spatial data of the match.

14. The non-transitory computer readable medium of claim 10, wherein the player style information for the first player and the player style information for the second player are derived from spatial data of the match.

15. The non-transitory computer readable medium of claim 10, further comprising:
generating, by the computing system, a momentum metric based on the live match prediction, wherein the momentum metric represents a change in current win probability over a set amount of points.

16. The non-transitory computer readable medium of claim 10, wherein utilizing, by the computing system, the simulator to generate the additional metric based on the live match prediction further comprises:
generating, by the computing system via the simulator, a clutchness metric based on the live match prediction, wherein the clutchness metric is based on points of the match that yield a greater than the threshold.

17. The non-transitory computer readable medium of claim 10, further comprising:
generating, by the computing system, a plus-minus metric for the first player and the second player based on the live match prediction, wherein the plus-minus metric represents a difference between how many points the first player is expected to win and how many points the second player is expected to win and how many points the first player won and how many points the second player did win.

18. A system comprising:
a processor; and
a memory having programming instructions stored thereon, which, when executed by the processor, causes the system to perform operations comprising:
tracking, via at least one calibrated camera and at least one tag, one or more motions of a first player and a second player on a playing surface and one or more objects;
based on the tracking, storing at least one player identity corresponding to the first player and the second player and positional information corresponding to the first player, the second player, and the one or more objects as pre-match data in a data store;
receiving the pre-match data for a match between the first player and the second player from a data store, the pre-match data comprising player strength information for the first player and the second player, player style information for the first player and the second player, a playing surface type, or one or more weather conditions;
generating, using one or more prediction models, a pre-match prediction based on the pre-match data, wherein the pre-match prediction includes one or more metrics associated with scoring data at a game-level, a set-level, and/or a match level;
receiving in-match data for the match currently in progress, wherein the in-match data comprises one or more of match-state information, match-statistics and features, momentum, the player strength information for the first player and the second player, the player style information for the first player and the second player, the playing surface type, or one or more updated weather conditions;

generating, using the one or more prediction models, a live match prediction based on the in-match data and the pre-match prediction; and utilizing a simulator to generate an additional metric based on the live match prediction, wherein the additional metric includes one or more match events that indicate a change in win-probability greater than a threshold;

identifying, using the one or more prediction models, at least one player that has a best performance during the one or more match events based on the additional metric; and outputting, by the computing system, a visual representation corresponding to the live match prediction and the at least one player on a display.

19. The system of claim 18, wherein the operations further comprise:

generating a momentum metric based on the live match prediction, wherein the momentum metric represents a change in current win probability over a set amount of points.

20. The system of claim 18, wherein utilizing the simulator to generate the additional metric based on the live match prediction further comprises:

generating, via the simulator, a clutchness metric based on the live match prediction, wherein the clutchness metric is based on points of the match that yield a greater than the threshold.

* * * * *